United States Patent [19]

Rinkovsky, Sr.

[11] Patent Number: 4,702,390
[45] Date of Patent: Oct. 27, 1987

[54] COMPOSITE PLANT HOLDERS AND METHOD OF MAKING THEM

[76] Inventor: Robert C. Rinkovsky, Sr., R.D. 1, Central Ave., Whitehouse Station, N.J. 08889

[21] Appl. No.: 908,642

[22] Filed: Sep. 18, 1986

[51] Int. Cl.$^4$ ............................................. B65D 90/04
[52] U.S. Cl. ..................................... 220/453; 29/460; 29/527.4; 47/66; 220/450; 220/454; 220/457; 264/257; 264/269; 427/236; 427/239; 427/388.1; 427/409
[58] Field of Search ...................... 427/236, 239, 388.1, 427/388.2, 409; 47/66, 72, 84; 220/450, 453, 454, 457; 156/279, 305; 29/460, 527.4; 264/257, 267, 269, 310

[56] References Cited
U.S. PATENT DOCUMENTS

| | | | |
|---|---|---|---|
| 2,112,670 | 3/1938 | Henchert | 47/66 |
| 2,570,958 | 10/1951 | Lee | 220/453 |
| 2,959,812 | 11/1960 | Allen | 264/267 |
| 3,447,946 | 6/1969 | Roe, Jr. | 427/236 |
| 3,981,955 | 9/1976 | Otani et al. | 264/310 |
| 4,104,357 | 8/1978 | Blair | 264/310 |
| 4,237,177 | 12/1980 | Slama et al. | 427/388.1 |
| 4,271,216 | 6/1981 | Shimizo | 427/409 |
| 4,495,125 | 1/1985 | Hatakegama et al. | 264/269 |

Primary Examiner—Frederick R. Schmidt
Assistant Examiner—Robert Showalter
Attorney, Agent, or Firm—Kenneth P. Glynn

[57] ABSTRACT

The present invention is directed to a composite plant holder and a method of making a composite plant holder. Specifically, the method comprises forming the external vertical shape of a desired plant holder by shaping metal sheet and permanently attaching opposite ends of the metal sheet to one another. This metal sheet is then placed on a flat non-adhering surface in its upright or vertical position. Next, a gel coat is applied to the walls of the metal sheet and to the open bottom. Subsequently, a mixture of resin and fiber to form fiberglass is applied on the inside wall as well as on the bottom. This results in the formation of a receptacle which has the metal sheet for outside vertical surfaces and has layers of gel coat and fiberglass for inside walls and a base. Any resin and fiber which extends beyond the top of the sheet metal is cut either while the resin and fiber have not yet hardened or after they have hardened. In a preferred embodiment, the plant holder is cylindrical in configuration, employs a lock seam for joining the ends of the sheet metal to one another and includes 180° lips and its top and bottom.

9 Claims, 5 Drawing Figures

COMPOSITE PLANT HOLDERS AND METHOD OF MAKING THEM

BACKGROUND OF THE INVENTION

1. Field of the Invention

The present invention is directed broadly to containers or receptacles and more specifically to the types of containers which are called plant holders, planters or plant pots. Also, it should be noted that while these particular receptacles are designed for the purpose of holding plants, they may be used for alternative purposes such as waste baskets or containers for other purposes. Nonetheless, the primary purpose of the products and methods of the present invention is to hold plants.

2. Prior Art Statement

Although a formal search has not been conducted at the time this application was filed, it is known that composite receptacles such as planters have been created in the past by competitors of the inventor herein. For example, Metal Weave Products Corp. of New Rochelle, N.Y. has developed a composite planter which is either aluminum or galvanized steel on the inside with a wrapped finished metal on the outside. However, this prior art product is riveted and is not lock sealed as in the present invention, the bottoms have voids at their outer edges which create weaknesses at the base of the products which subject these prior art products to easy damage, pitting and leaking. In addition, because of the fact that two metals of different types are used and riveted together, rusting does occur. The present invention overcomes these shortcomings by providing for a combination of composite materials which does not require riveting, does not create voids in the bottom of the product, does not typically tip, leak or rust and is fabricated at a relatively economic cost.

SUMMARY OF THE INVENTION

The present invention is directed to a composite plant holder and a method of making a composite plant holder. Specifically, the method comprises forming the external vertical shape of a desired plant holder by shaping metal sheet and permanently attaching opposite ends of the metal sheet to one another. This metal sheet is next placed on a flat, non-adhering surface in its upright, i.e. vertical, position and is then gel coated on its inside and on the open bottom. Subsequently, a mixture of resin and fiber to form fiberglass is applied on the inside wall as well as on the bottom after the gel coat has hardened. This results in the formation of a receptacle which has the metal sheet for outside vertical surfaces but has at least one layer of gel coat and one or more layers of fiberglass with the metal sheet to form the walls and without the metal sheet to form the base. Any resin and fiber which extends beyond the top of the metal sheet is cut either while the resin and fiber have not yet hardened or after they have hardened.

BRIEF DESCRIPTION OF THE DRAWINGS

The invention will further be described by way of example with reference to the accompanying drawings, in which.

DETAILED DESCRIPTION OF THE PRESENT INVENTION

Figure 1:
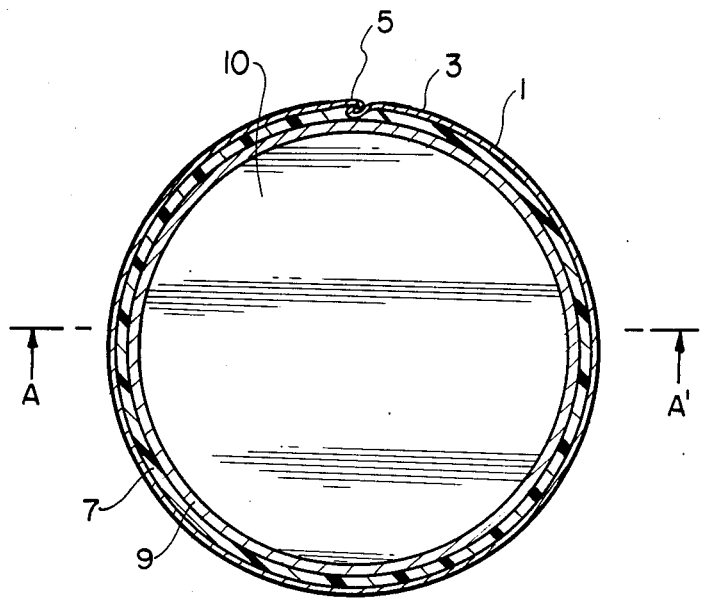
FIG. 1 is a top view of a cylindrical preferred embodiment plant holder of the present invention.
Figure 2:
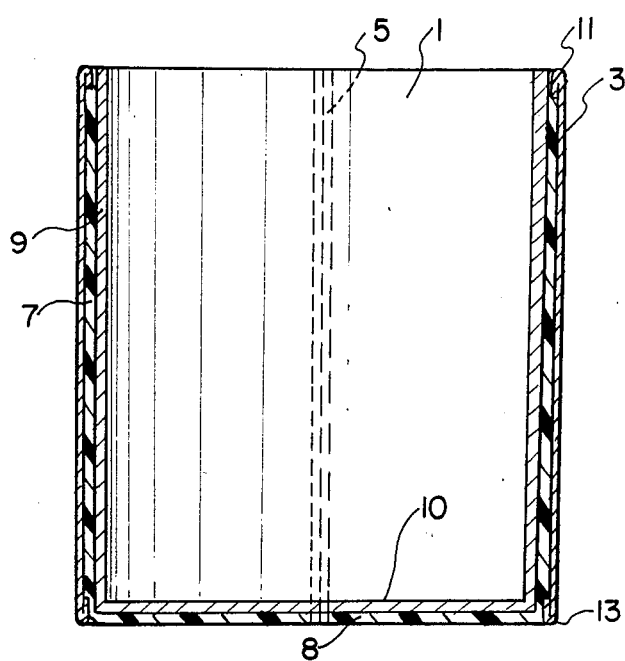
FIG. 2 is a cut front view along the dotted lines A—A' of the device shown in FIG. 1.

Referring now to FIG. 1 and FIG. 2, plant holder 1 is shown in its top view. The outer portion thereof is metal sheet 3. In this embodiment it is formed in its top view in a circular pattern so as to form a hollow cylinder. The opposite ends of metal sheet 3 are joined together by a lock seam 5. Metal sheet 3 in this case is a preplated steel but could be any metal, either brushed or polished, including, but not limited to, brass, chrome, steel and other metals. In addition, metal sheet 3 could include a paint or enamel on its outside surface.

The metal sheet is next placed on a clear, nonadhering, smooth surface and a gel coat 7 is applied to the inside walls of the metal sheet 3 and the open bottom (gel coat at the bottom is shown as gel coat 8). The gel coat generally consists of a polyester resin which is typically used in fiberglass applications. Although a polyester resin gel coat is preferred, it should be recognized that any gel coat which will adhere to the inside of the metal and which will act as an interlayer and base to which fiberglass may be adhered can be used without exceeding the scope of the present invention. After gel coat 7 is applied, e.g. by spraying with a spray gun, or by any other viable technique, it is allowed to set up. After the gel coat has set up, fiberglass is then applied to the inside of gel coat 7 and gel coat 8. Subsequently, the resin and fiber of the fiberglass to be formed is applied to the gel coat 7 and 8 so that a continuous fiberglass innerwalls and base structure is formed generally designated as fiberglass layer 9 and 10. FIGS. 1 and 2 when viewed in conjunction with one another make this clearer in that they illustrate both the top and cut views of the same structure. Thus, as shown in FIG. 2, although the gel coat interlayer is exaggerated, gel coat 7 is shown between metal sheet 3 and fiberglass layer 9 in its vertical aspects and continues as gel coat 8 forming the bottom of plant holder 1 with fiberglass layer 10 forming the inside base. Additionally, although optional, top lip 11 and bottom lip 13 are shown which constitute bent over edges to create a better seal between the various coatings and smoother outer rims both at the top and at the base of plant holder 1.

Figure 3:
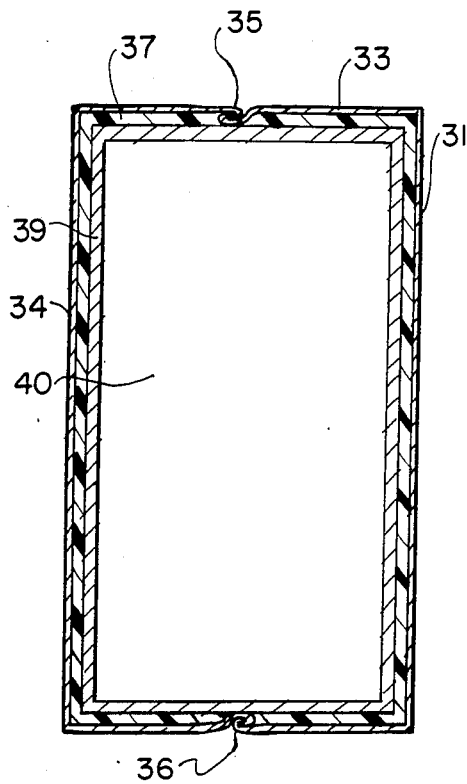
FIG. 3 represents the top view of another preferred embodiment of the present invention having a rectilinear configuration.

FIG. 3 shows a top view of a rectilinear plant holder of the present invention designated generally as plant holder 31. In this embodiment, plant holder 31 has two metal sheets 33 and 34, which is a brushed chrome metal which are connected at their opposite ends via lock seams 35 and 36. The metal sheets 33 and 34 are next placed in its vertical position, i.e., stood up, on a flat, smooth, non-adhering surface such as a smooth metal surface, glass surface or the like. Gel coat 37 is applied to the inside wall of metal sheets 33 and 34 and open bottom 40. A mixture of resin and fiber is applied to the gel coat 37 including sides and bottom so as to form a continuous fiberglass receptacle having side walls 39 and base (covering the gel coat on the bottom 40). The resin and fiber may be applied manually or it may be applied by a mechanical chopper gun.

Figure 4:
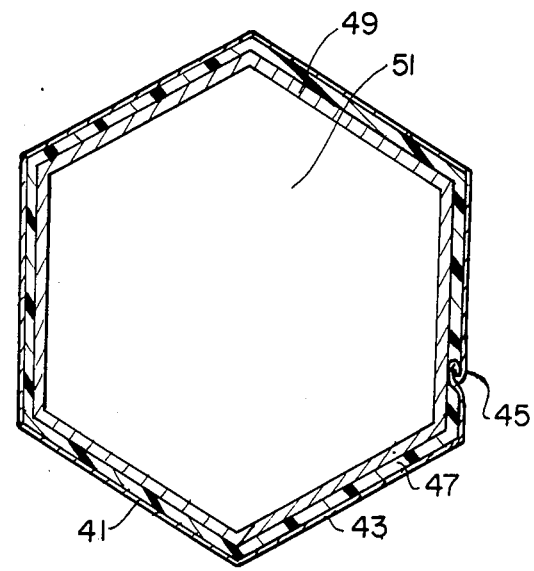
FIG. 4 is a top view of a hexagonal type plant holder of the present invention.

FIG. 4 shows a top view of a hexagonal plant holder 41 having a polished brass metal sheet 43 with a lock seam 45 where opposite ends are connected to one another and having gel coat 47 which covers the walls and the base, and fiberglass layer 49 including base 51.

Figure 5:
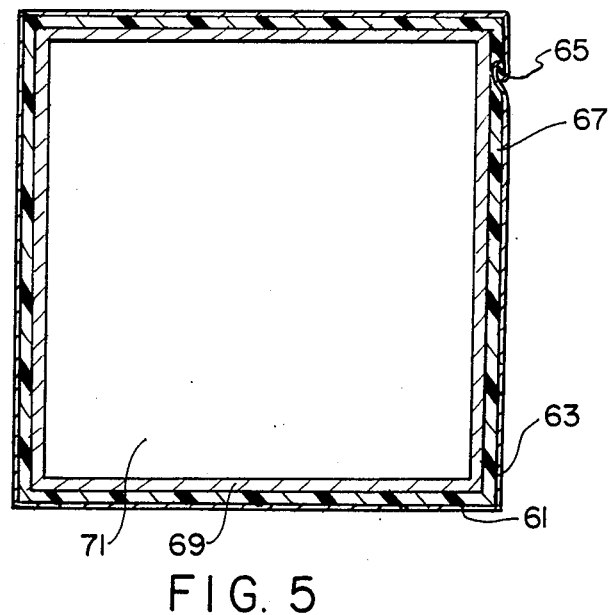
FIG. 5 shows a top view of a square plant holder of the present invention.

FIG. 5 shows a plant holder 61 similar to plant holder 31 of FIG. 3, except that this particular plant holder is square in configuration. Plant holder 61 includes metal sheet 63 with lock seam 65, gel coat 67 and a fiberglass layer which forms walls 69 and base 71.

Obviously, numerous modifications and variations of the present invention are possible in light of the above teachings. It is therefore to be understood that within the scope of the appended claims, the invention may be practiced otherwise than as specifically described herein.

What is claimed is:

1. A method of making a composite plant holder which comprises:
   (a) forming the external vertical shape of the desired plant holder by shaping metal sheet and then permanently attaching opposite ends of the metal sheet to one another;
   (b) providing said metal sheet with 180° folded lips over portions at the top and bottom of said metal sheet;
   (c) placing the vertically formed metal sheet on a flat, non-adhering surface in its vertical position;
   (d) gel coating the inside walls of said metal sheet and the open bottom formed by the metal sheet and the flat, non-adhering surface, with a gel coat for subsequent application of fiberglass;
   (e) applying a mixture of resin and fiber on the inside walls against the aforesaid gel coat and down onto the bottom thereof; and,
   (f) cutting any resin and fiber which extends beyond the top of said sheet metal.

2. The method of claim 1 wherein said gel coat is applied by spraying with a spray gun.

3. The method of claim 1 wherein said resin and fiber is applied manually.

4. The method of claim 1 wherein said resin and fiber is applied mechanically by a chopper gun.

5. The method of claim 1 wherein said cutting is performed prior to the time the fiberglass resin and fiber harden.

6. The method of claim 1 wherein said opposite ends of the metal sheet are attached with a lock seam.

7. The method of claim 1 further comprising the step of applying a coloring coating to the outside surface of said metal sheet selected from the group consisting of a coating of paint or a coating of enamel.

8. A product produced by the method of claim 1.

9. The product of claim 8 wherein said metal sheet is selected from the group consisting of brushed brass, polished brass, brushed chrome, polished chrome, brushed steel and polished steel.

* * * * *